(12) United States Patent
Ellis

(10) Patent No.: US 7,827,582 B2
(45) Date of Patent: Nov. 2, 2010

(54) PROGRAM GUIDE SYSTEM WITH VIDEO-ON-DEMAND BROWSING

(75) Inventor: Michael D. Ellis, Boulder, CO (US)

(73) Assignee: United Video Properties, Inc., Tulsa, OK (US)

(*) Notice: Subject to any disclaimer, the term of this patent is extended or adjusted under 35 U.S.C. 154(b) by 0 days.

(21) Appl. No.: 11/894,666

(22) Filed: Aug. 20, 2007

(65) Prior Publication Data

US 2008/0276275 A1    Nov. 6, 2008

Related U.S. Application Data

(62) Division of application No. 09/262,870, filed on Mar. 4, 1999, now Pat. No. 7,603,684.

(60) Provisional application No. 60/086,046, filed on May 19, 1998.

(51) Int. Cl.
    *H04N 7/173* (2006.01)
(52) U.S. Cl. ............... 725/93; 725/86; 725/87; 725/95; 725/97
(58) Field of Classification Search ............ 725/37–41, 725/86, 87, 93, 95, 97
    See application file for complete search history.

(56) References Cited

U.S. PATENT DOCUMENTS

| | | |
|---|---|---|
| 4,488,179 A | 12/1984 | Kruger et al. |
| 4,506,387 A | 3/1985 | Walter |
| 4,706,121 A | 11/1987 | Young |
| 4,751,578 A | 6/1988 | Reiter et al. |
| 4,787,063 A | 11/1988 | Muguet |
| 4,963,994 A | 10/1990 | Levine |
| 4,977,455 A | 12/1990 | Young |
| 5,027,400 A | 6/1991 | Baji et al. |
| 5,038,211 A | 8/1991 | Hallenbeck |
| 5,047,867 A | 9/1991 | Strubbe et al. |
| 5,151,789 A | 9/1992 | Young |
| 5,206,722 A | 4/1993 | Kwan |
| 5,231,493 A | 7/1993 | Apitz |

(Continued)

FOREIGN PATENT DOCUMENTS

EP    0 624 039    11/1994

(Continued)

OTHER PUBLICATIONS

"Addressable Converters: A New Development at CableData," Via Cable, vol. 1, No. 12 (Dec. 1981).

(Continued)

*Primary Examiner*—Hunter B. Lonsberry
(74) *Attorney, Agent, or Firm*—Ropes & Gray LLP

(57) ABSTRACT

An interactive television program guide system is provided in which a viewer may direct a television to simultaneously display a selected television program and a program guide display. A viewer may use the program guide display to browse available video-on-demand (VOD) while continuing to view a previously selected program in the background. The viewer may browse through video-on-demand programs on the program guide display using a variety of keys on a remote control unit. The viewer may direct the program guide to order a given video-on-demand program, and set a desired broadcast time for that program.

30 Claims, 12 Drawing Sheets

U.S. PATENT DOCUMENTS

| | | | |
|---|---|---|---|
| 5,253,066 A | 10/1993 | Vogel | |
| 5,291,554 A | 3/1994 | Morales | |
| 5,299,006 A | 3/1994 | Kim | |
| 5,353,121 A | 10/1994 | Young et al. | |
| 5,412,720 A | 5/1995 | Hoarty | |
| 5,465,385 A | 11/1995 | Ohga et al. | |
| 5,479,268 A | 12/1995 | Young et al. | |
| 5,502,504 A | 3/1996 | Marshall et al. | |
| 5,523,796 A | 6/1996 | Marshall et al. | |
| 5,530,754 A | 6/1996 | Garfinkle | |
| 5,555,441 A | 9/1996 | Haddad | |
| 5,557,338 A | 9/1996 | Maze et al. | |
| 5,559,548 A | 9/1996 | Davis et al. | |
| 5,559,549 A | 9/1996 | Hendricks et al. | |
| 5,583,560 A | 12/1996 | Florin et al. | |
| 5,585,866 A | 12/1996 | Miller et al. | |
| 5,589,892 A | 12/1996 | Knee et al. | |
| 5,594,509 A | 1/1997 | Florin et al. | |
| 5,600,364 A | 2/1997 | Hendricks et al. | |
| 5,600,573 A | 2/1997 | Hendricks et al. | |
| 5,619,249 A | 4/1997 | Billock et al. | |
| 5,657,072 A * | 8/1997 | Aristides et al. | 725/46 |
| 5,659,350 A | 8/1997 | Hendricks et al. | |
| 5,682,195 A | 10/1997 | Hendricks et al. | |
| 5,710,601 A | 1/1998 | Marshall et al. | |
| 5,734,853 A | 3/1998 | Hendricks et al. | |
| 5,751,282 A | 5/1998 | Girard et al. | |
| 5,752,160 A | 5/1998 | Dunn | |
| 5,781,227 A | 7/1998 | Goode et al. | |
| 5,781,246 A | 7/1998 | Alten et al. | |
| 5,793,412 A | 8/1998 | Asamizuya | |
| 5,793,971 A | 8/1998 | Fujita et al. | |
| 5,805,154 A | 9/1998 | Brown | |
| 5,805,763 A | 9/1998 | Lawler et al. | |
| 5,828,420 A | 10/1998 | Marshall et al. | |
| 5,850,218 A | 12/1998 | LaJoie et al. | |
| 5,861,906 A | 1/1999 | Dunn et al. | |
| 5,982,303 A | 11/1999 | Smith | |
| 6,002,444 A | 12/1999 | Marshall et al. | |
| 6,014,184 A | 1/2000 | Knee et al. | |
| 6,020,929 A | 2/2000 | Marshall et al. | |
| 6,128,009 A | 10/2000 | Ohkura et al. | |
| 6,157,413 A | 12/2000 | Hanafee et al. | |
| 6,177,931 B1 | 1/2001 | Alexander et al. | |
| 6,211,901 B1 | 4/2001 | Imajima et al. | |
| 6,305,016 B1 | 10/2001 | Marshall et al. | |
| 6,324,338 B1 | 11/2001 | Wood et al. | |
| 6,330,586 B1 | 12/2001 | Yates et al. | |
| 6,330,856 B1 | 12/2001 | Fitzgerald et al. | |
| 6,331,877 B1 | 12/2001 | Bennington et al. | |
| 6,342,926 B1 | 1/2002 | Hanafee et al. | |
| 6,373,528 B1 | 4/2002 | Bennington et al. | |
| 6,396,546 B1 | 5/2002 | Alten et al. | |
| 6,418,556 B1 | 7/2002 | Bennington et al. | |
| 6,419,137 B1 | 7/2002 | Marshall et al. | |
| 6,453,471 B1 | 9/2002 | Klosterman | |
| 6,571,390 B1 | 5/2003 | Dunn et al. | |
| 6,606,128 B2 | 8/2003 | Hanafee et al. | |
| 6,732,369 B1 * | 5/2004 | Schein et al. | 725/39 |

FOREIGN PATENT DOCUMENTS

| | | |
|---|---|---|
| EP | 0 725 538 | 8/1996 |
| JP | 60-61935 | 4/1985 |
| JP | 07-303249 | 11/1995 |
| JP | 08-130517 | 5/1996 |
| JP | 08-331545 | 12/1996 |
| JP | 09-009235 | 1/1997 |
| JP | 10-042207 | 2/1998 |
| JP | 10-042219 | 2/1998 |
| WO | WO 89/12370 | 12/1989 |
| WO | WO 95/01058 | 1/1995 |
| WO | WO 95/28799 | 10/1995 |
| WO | WO 96/34491 | 10/1996 |
| WO | WO 96/41477 | 12/1996 |
| WO | WO 97/13368 | 4/1997 |
| WO | WO 97/34414 | 9/1997 |
| WO | WO 97/42763 | 11/1997 |
| WO | WO 97/49242 | 12/1997 |
| WO | WO 97/50251 | 12/1997 |
| WO | WO 98/06219 | 2/1998 |
| WO | WO 98/18260 | 4/1998 |
| WO | WO 98/19459 | 5/1998 |
| WO | WO 98/27723 | 6/1998 |
| WO | WO 98/31115 | 7/1998 |
| WO | WO 98/31116 | 7/1998 |
| WO | WO 98/47283 | 10/1998 |
| WO | WO 00/04706 | 1/2000 |
| WO | WO 00/16548 | 3/2000 |

OTHER PUBLICATIONS

CableData brochure, "A New Approach To Addressability" (undated).

James Sorce et al., "Designing a Broadband Residential Entertainment Service: A Case Study," 13th International Symposium Human Factors in Telecommunications, Torino, Italy, Sep. 10-14, 1990 pp. 141-148.

Matthew D. Miller, "A Scenario for the Deployment of Interactive Multimedia Cable Television Systems in the United States in the 1990's," Proceedings of the IEEE, vol. 82, No. 4, pp. 585-589 (Apr. 1994).

News.com, Mar. 20, 1998, http://news.com.com/2100-1001-209331.html?tag=bplst.

Vito Brugliera, "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).

Yee-Hsiang Chang et al., "An Open-Systems Approach to Video on Demand," IEEE Communications Magazine, vol. 32, pp. 68-80 (May 1994).

Harms, J.J., "Video Distribution to the Home Using Advance Reservation", IEEE, pp. 170-178, 1997.

Little, Thomas et al., "Prospects for Interactive Video-on-Demand", IEEE MultiMedia, vol. 1, No. 3, pp. 14-24, 1994.

* cited by examiner

PROGRAM GUIDE SYSTEM WITH VIDEO-ON-DEMAND BROWSING

This application is a continuation of U.S. patent application Ser. No. 09/262,870, filed Mar. 4, 1999, now U.S. Pat. No. 7,603,684, which claims benefit of U.S. provisional application 60/086,046 filed May 19, 1998, which are hereby incorporated by reference herein in their entireties.

BACKGROUND OF THE INVENTION

This invention relates to interactive television program guides, and more particularly, to television program guides that allow viewers to browse video-on-demand programs. A television program and a program guide display containing information for video-on-demand programs may be simultaneously displayed on a display screen.

Throughout the history of television, broadcasting networks have been striving to provide television viewers with interesting programming shown at convenient viewing times. This has proven to be a difficult task given the vast diversity of the television viewing public. Over time, cable systems with services such as "pay-per-view" and "request" channels emerged which provided television viewers with greater programming variety and more control over their program viewing schedule. However, these systems offered viewers a relatively small number of programs shown at only a few predetermined broadcast times.

More recently, video-on-demand or "VOD" programs have become available to some cable system subscribers. Video-on-demand programs generally consist of a library or database of programs that are available at any time for viewing. Such programs are typically stored in a video server located in a nearby television distribution facility. A viewer may select a program from the database and request the video server to provide that program. The video server processes this request, and, if the selected program is available, routes a video signal of that program to the viewer's television equipment. Such video-on-demand systems allow viewers to watch the programs contained in the database at virtually any time.

Television program guides help television viewers to select programs of interest. Television viewers have traditionally consulted printed program schedules to determine programs being broadcast at a particular time. Recently, cable, satellite, and broadcast television systems have provided viewers with an increasingly large number of television channels to choose from. As the number of potential programs of interest to the viewer has increased, interactive electronic program guides have been developed to help viewers determine which programs may be of particular interest. Such interactive program guides are usually implemented using a microprocessor-controlled set-top box that is coupled to the viewer's television set. These set-top boxes typically receive program information from a central broadcasting center and store it in a memory within the set-top box. The information typically includes program titles, broadcast times, channels, program descriptions, etc.

Viewers can invoke the program guide display and use up and down remote control cursor keys to peruse program listings for available programming. Once a program of interest has been located, the viewer can direct the remote control to command the set-top box to display that program.

Current interactive video-on-demand program guides display program listings on the viewer's display screen. A text description of the displayed program and ordering options are also provided. This type of video-on-demand program guide display covers the entire television screen and does not allow the viewer to view both the video-on-demand program guide display and a previously selected television channel. If the viewer is interested in viewing video-on-demand programs, he or she must leave any programming in progress and display a full-screen program guide overlay to view video-on-demand programming options.

It is therefore an object of the present invention to provide a video-on-demand program guide system with improved capabilities for viewing and selecting television programs.

It is another object of the present invention to provide a video-on-demand program guide system that allows a viewer to simultaneously view both a video-on-demand program guide display and a selected television program on a television display screen.

SUMMARY OF THE INVENTION

These and other objects of the invention are accomplished in accordance with the principles of the present invention by providing an interactive television program guide system with a video-on-demand browse capability. A viewer may direct the program guide to present a program guide display on viewer television equipment that contains video-on-demand programs.

The program guide display of the present invention contains information for one or more video-on-demand (VOD) programs in a given category. Information about video-on-demand programs in other categories is not shown. A viewer may obtain information about other video-on-demand programs in a particular category by browsing through the programs on the program guide using up and down cursor keys. Other video-on-demand program categories may be selected using left and right cursor keys.

When the program guide display is active, the program guide may reduce the amount of screen area used by the current channel so that the program guide display and the current channel are displayed unobscured. However, if desired, the program guide display may be superimposed on a portion of the viewer's television screen such that the viewer may continue to watch a previously selected program in the background while the program guide is displayed. This allows the viewer to continue watching a program while browsing for video-on-demand programs.

The program guide display may contain brief text descriptions of the displayed video-on-demand programs. When the viewer browses through available programming with remote control cursor keys, each brief description may be automatically updated to correspond to the displayed program.

A viewer may obtain more information about a given video-on-demand program by pressing an info key located on a remote control unit. This may cause a detailed information screen to appear which supplies additional information about that video-on-demand program.

A viewer may order a video-on-demand program by pressing an on-screen button or by pressing a key on a remote control unit such as a select key. This may cause a configuration and control screen to appear that requires the viewer to input information to complete the order. Such information may include entering a parental control code and/or entering a desired program start time. The program guide may provide the viewer with a confirmation screen to confirm the viewer's order.

Further features of the invention, its nature and various advantages will be more apparent from the accompanying drawings and the following detailed description of the preferred embodiments.

DETAILED DESCRIPTION OF THE PREFERRED EMBODIMENTS

Figure 1A:
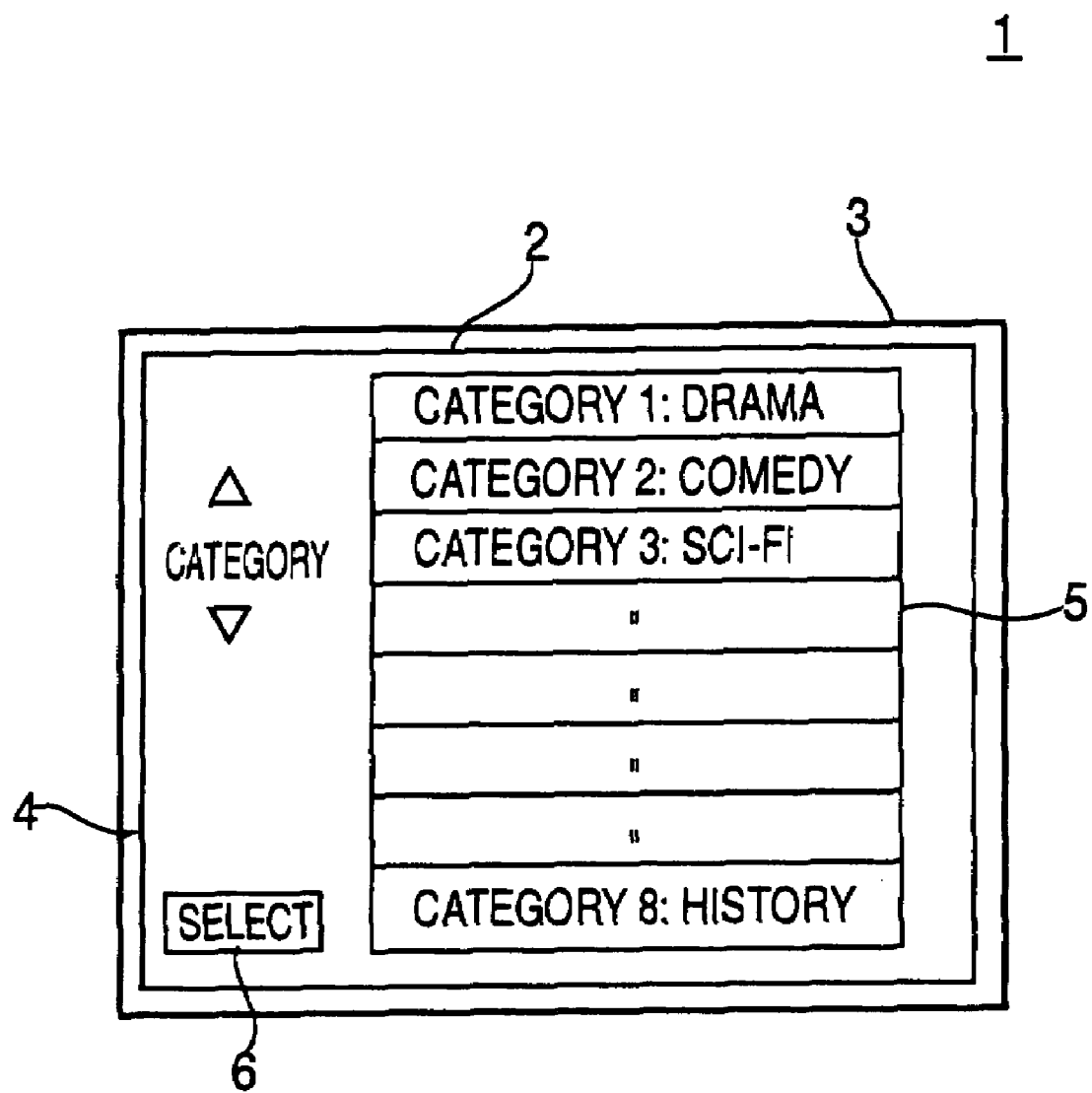
FIG. 1A is a conventional video-on-demand program guide display which covers the majority of the viewer's display screen and allows the viewer to select a category of programs.
Figure 1B:
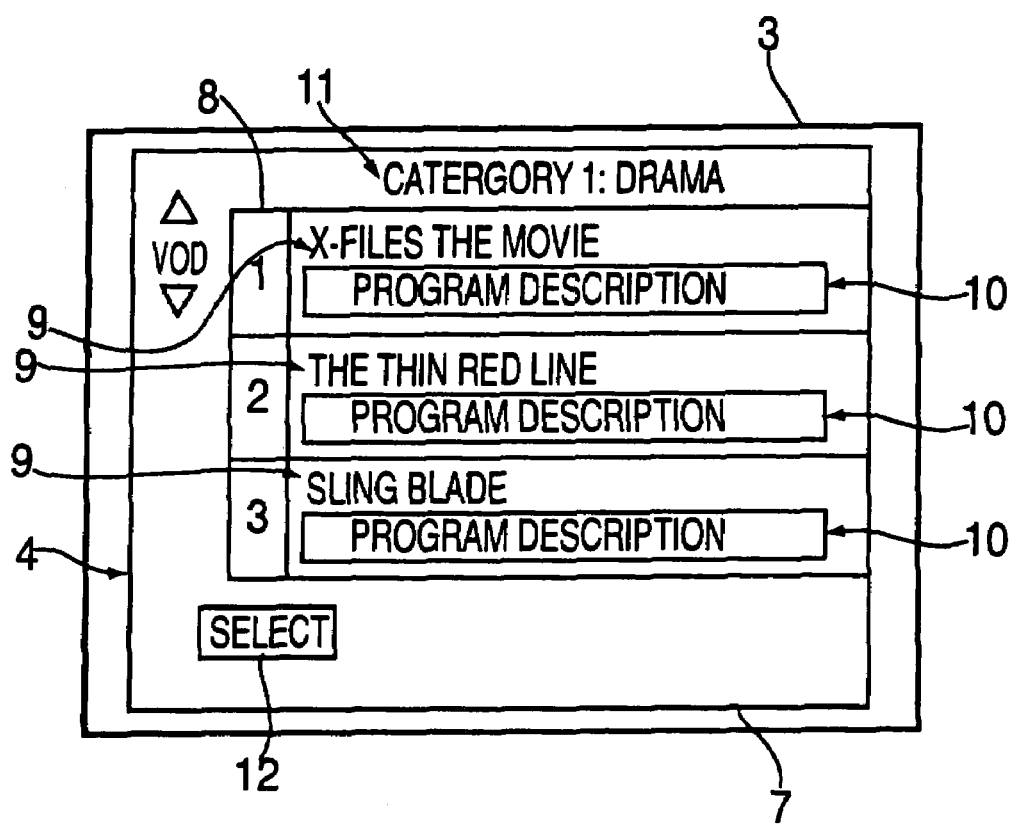
FIG. 1B is a conventional video-on-demand program guide display which covers the majority of the viewer's display screen and allows the viewer to peruse programs in a particular category.
Figure 1C:
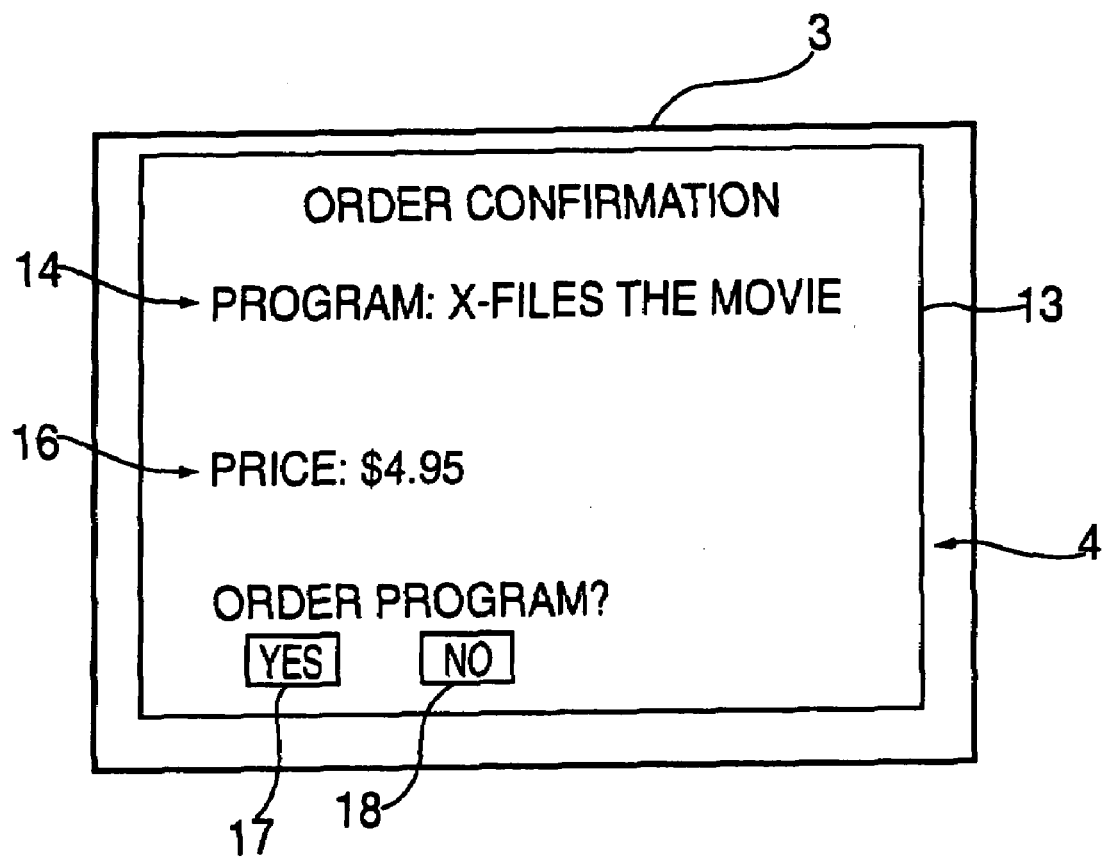
FIG. 1C is a conventional video-on-demand program guide display order confirmation screen which covers the majority of the viewer's display screen.

A set of program guide display screens 1 provided by a conventional video-on-demand program guide system (not shown) is illustrated in FIGS. 1A-1C. With this system, the viewer may view available video-on-demand program listings. When invoked, the program guide initially presents a category display 2, (shown in FIG. 1A) on a display screen 3 that is overlaid on top of a program in progress 4. Category display 2 contains a series of video-on-demand program categories 5 and an on-screen program select button 6. The viewer may scroll through the available program categories 5 and choose a category of interest using certain remote control keys (not shown). A category of interest may also be selected using an on-screen select button 6.

When a category is chosen, the program guide presents a program display 7 (shown in FIG. 1B) on display screen 3 which is overlaid on top of program in progress 4. Display 7 typically contains multiple program listings 8 from a selected category 11, each of which include a program title 9 and a program description box 10. The viewer may view program listings for video-on-demand programs using cursor keys on a remote control (not shown) to scroll through program listings 8. If the viewer desires to order a particular video-on-demand program 9 shown on program guide display 7 (e.g., X-Files The Movie), the viewer may press an on-screen select button 12 or use a dedicated button on a remote control (not shown). Once a program is selected, the program guide display presents an order confirmation screen 13 (shown in FIG. 1C), which contains a selected program title 14, a price 16, and on-screen buttons 17 and 18. The viewer may order selected program 14 by pressing YES key 17 or cancel the order by pressing NO key 18. The program order and also be confirmed or canceled using certain keys on a remote control (not shown).

There are a number of disadvantages associated with the arrangements of FIGS. 1A-1C. For example, the program guide displays shown in FIGS. 1A-1C do not allow the viewer to watch video from a previously selected channel while viewing available video-on-demand programs. The viewer must leave any programming currently in progress and display full-screen program guide displays 2, 7, and 13 in order to select video-on-demand programs.

In addition, the viewer cannot: (1) change program category 11 while in program display 7 without first returning to the category browse screen 2, (2) choose a start time for a selected video-on-demand program, (3) view a video clip preview of a video-on-demand program.

In contrast, the present invention provides a program guide having a browsing display that allows a viewer to browse through and select a video-on-demand program from a list of available video-on-demand programs while continuing to view a previously selected television program. The viewer may select a video-on-demand program and choose a start time for that program. The viewer may also view video clips of certain video-on-demand program listed on the program guide.

The program guide display may be a single cell in width (i.e., in the horizontal dimension) and a single cell in length (i.e., in the vertical dimension). Or, if desired, multiple cells may be displayed containing multiple video-on-demand program listings. A brief text program description may be provided in the cell for displaying a description of the currently listed video-on-demand program. If the viewer desires to obtain more information about a particular video-on-demand program, he or she may direct the program guide to display additional screens with detailed information about that program.

Figure 2:
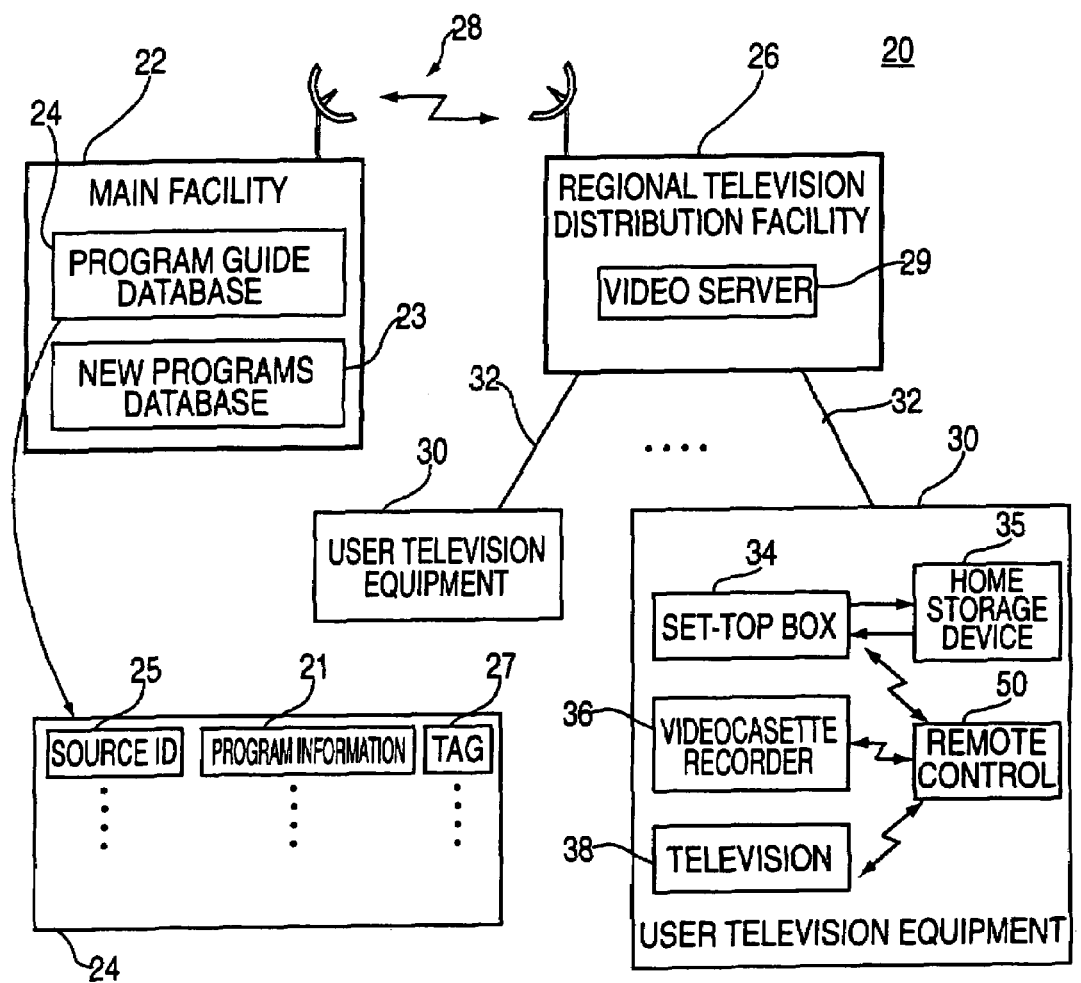
FIG. 2 is a diagram of a system in which an interactive television program guide may be implemented in accordance with the present invention.

An illustrative program guide system 20 in accordance with the present invention is shown in FIG. 2. Program guide system 20 may include a main facility 22, a regional television distribution facility 26, and user television equipment 30. Main facility 22 (which may be multiple facilities 22) contains a program guide database 24 for storing program guide information 21 such as video-on-demand program guide listings data, ordering data, television program guide listings data, pay-per-view ordering information, television program promotional information, etc. Such information may be arranged by a Source identification code or address 25 and may also include a "tag" or other designation 27 to further identify the program type (i.e., video-on-demand, pay-per-view, etc.).

Information from program guide database 24 may be transmitted to regional television distribution facility 26 via communications link 28. In alternate embodiments, however, some or all of database 24 may be contained within regional facility 26 (not shown). Link 28 may be a satellite link, a telephone network link, a cable or fiber optic link, a microwave link, a combination of such links, or any other suitable communications path. If it is desired to transmit video signals over link 28 in addition to data signals, a relatively high bandwidth link such as a satellite link is generally preferable to a relatively low bandwidth link such as a telephone line.

Regional television distribution facility 26 is a facility for distributing television signals to viewers, such as a cable system headend, a local broadcast distribution facility, or a satellite television distribution facility.

In the arrangement shown in FIG. 2, a video server 29 may be included in distribution facility 26, which may contain a database 31 (FIG. 3) of video-on-demand programs for supplying those programs to viewers. Video server 29 (FIG. 3) may be comprised of any suitable digital, analog, or mixed digital and analog storage and retrieval system 33 that can provide viewer television equipment 30 with a video signal of a requested program. Such systems may include (but are not limited to) video cassette recorder (VCR) systems, digital versatile disc systems (DVD), laser disc systems, optical disc systems, magnetic tape and disc systems, and magneto-optical systems (such as a read/write digital disc systems), etc.

Video server 29 may also contain a controller 39, such as a networked computer system, which may be used in combination with the above-described storage and retrieval systems for processing video-on-demand program requests. Some of the functions performed by controller unit 39 may include various interfacing and control tasks such as communicating with other portions of program guide systems 20, receiving and transmitting billing information, checking program availability, queuing and coordinating program broadcast times, selecting and broadcasting requested programming, and routing selected programming to the requestor's location, etc.

Video servers 29 may be located at any suitable location in a given program guide system. For example, in FIG. 4, program guide system 40 is shown with video servers 29 placed in local television distribution facilities 41. Local distribution facilities 41 or "neighborhood nodes" may be used as intermediate distribution facilities coupled between regional television distribution facilities 26 and viewer television equipment 30.

Figure 4:
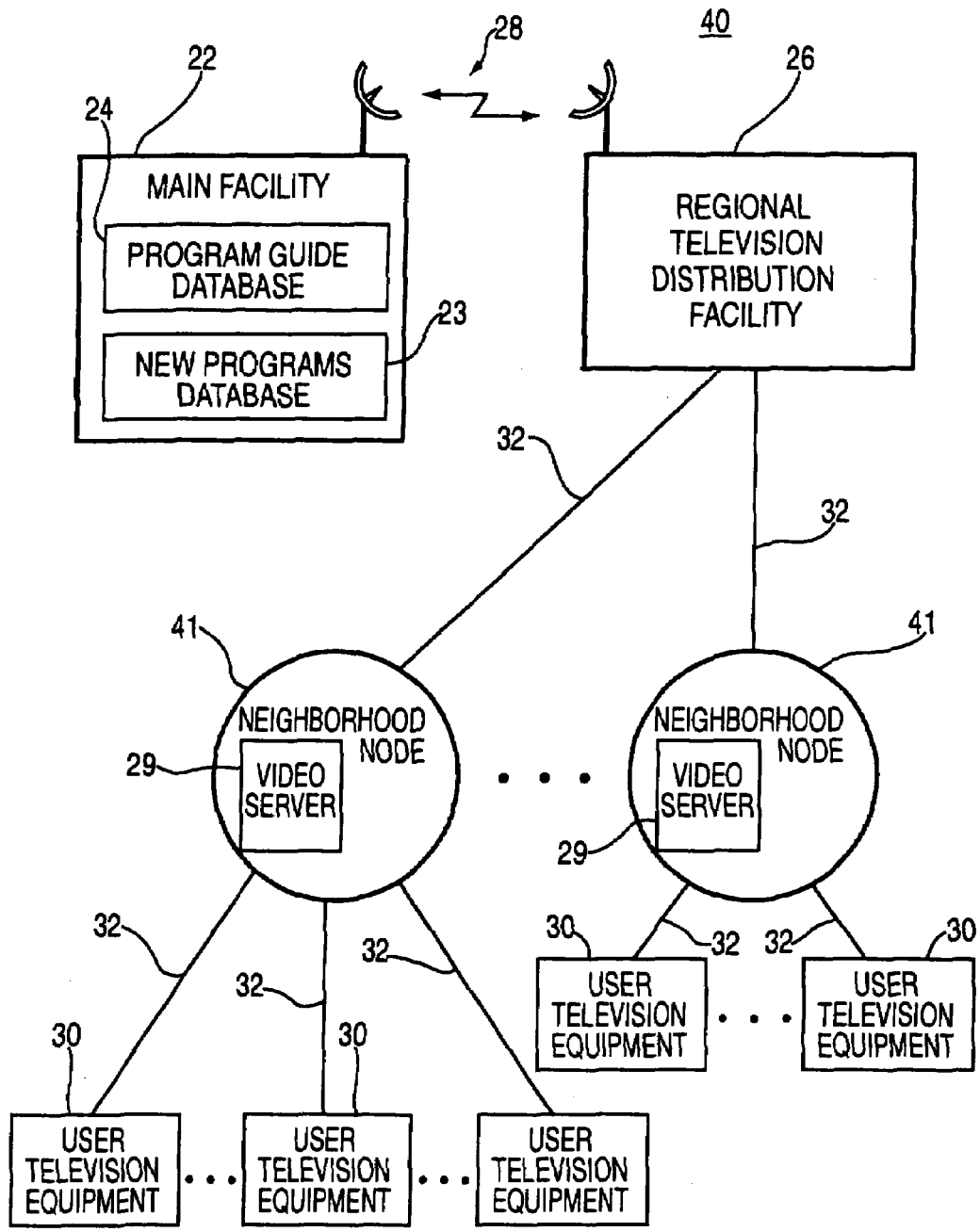
FIG. 4 is a diagram of another system in which an interactive television program guide may be implemented in accordance with the present invention.

As shown in FIG. 4, regional television distribution facility 26 may distribute television programming and program guide information 21 to neighborhood nodes 41 which may in turn distribute this information periodically, continuously, or on request to viewer television equipment 30 via communications paths 32. If desired, program guide information 21 may be stored within local nodes 41 and may be distributed periodically, continuously, or on request to viewer television equipment 30 via communications paths 32 (not shown). In either type of arrangement, television programming and program guide information can be distributed over analog television channels and program guide data may be distributed over an out-of-band channel on paths 32. Data distribution may also involve using one or more digital channels on paths 32. Such digital channels may also be used for distributing television programming and other information.

By providing multiple neighborhood nodes 41, two important benefits are realized: (1) reduces the demand on individual video-on-demand servers that may have a limited processing capacity, and (2) reduces the bandwidth requirement for communication paths 32.

Periodically, it may be necessary to update program database 31 to add recently released programs. Rather than manually update databases 31 at their respective geographical locations, video servers 29 may be configured so that the contents of program databases 31 can be remotely updated. Communication links 28 and/or 32 may be used to download new programs into databases 31. Such program transfers may occur during periods of low program demand in order to minimize the effect on system viewers. For example, in FIGS. 2 and 4, main facility 22 may contain a database 23 of new programs for distribution among video server databases 31. Program guide systems 20 and 40 may transmit these programs across communication links 28 to regional television distribution systems 26 that in turn may route those programs to video servers 29 (possibly via communications links 32). Controller 39 may then direct storage and retrieval system 33 to update database 31 to contain those programs.

Program guide information 21 transmitted by main facility 22 to regional television distribution facility 26 may include television program listings data for current programs, future programs, and video-on-demand programs. The program listings data for each program may include (but is not limited to) the title of the program, the channel for the program, a scheduled broadcast time (start-time) and an ending time (or duration). Other typical program data may include ratings, critics ratings, brief text descriptions, genres (sports, movies, children, etc.), actors, etc. Transmitted program information may also include advertising information and pay program data such as pricing information for individual programs including VOD programs and subscription channels, time intervals for ordering programs and channels, telephone numbers for placing orders that cannot be impulse ordered, etc.

As shown in FIG. 2, regional television distribution facility 26 may distribute television programming and program guide information to viewer television equipment 30 of multiple viewers via communications paths 32. For example, television programming may be distributed over analog television channels and program guide data may be distributed over an out-of-band channel on paths 32. Data distribution may also involve using one or more digital channels on paths 32. Such digital channels may also be used for distributing television programming and other information.

Viewer television equipment 30 typically contains set-top boxes 34. Viewer television equipment 30 may also be any suitable equipment into which circuitry similar to set-top box circuitry has been integrated, such as an advanced television receiver (such as HDTV), a personal computer television (PC/TV), or any other suitable television equipment. Multiple television and audio channels (analog, digital, or both analog and digital) may be provided to set-top boxes 34 via communications paths 32. If desired, program listings and other information may be distributed by one or more distribution facilities that are similar to but separate from television distribution facility 26 using communications paths that are separate from communications paths 32.

Certain functions such as ordering video-on-demand programs may require set-top boxes 34 to transmit data to local distribution facilities 41 (FIG. 4) and/or regional distribution facilities 26 over communication paths 32. Such data may be transmitted over telephone lines, cable, or other separate communication paths. If functions such as these are provided using facilities separate from regional television distribution facility 26, some of the communications involving set-top boxes 34 may be made directly with the separate facilities.

Each set of viewer television equipment 30 may have the capability to simultaneously receive, decode, and display two separate video signals. For example, viewer television equipment 30 may use a two-tuner set-top box. The tuners may have analog, digital, or mixed analog and digital capabilities. If desired, any other suitable arrangement may be used to handle the simultaneous display of two video signals.

Program guide data 21 may be distributed continuously, periodically, or on demand to viewer television equipment 30.

Regional television distribution facility 26 or neighborhood nodes 41 may also poll viewer television equipment 30 periodically for certain information (e.g., pay program account information or information regarding programs that have been purchased and viewed using locally-generated authorization techniques). Main facility 22 preferably contains a processor to handle information distribution tasks. Each viewer television equipment 30 preferably contains a processor to handle tasks associated with implementing an interactive television program guide on the viewer television equipment 30. Regional television distribution facility 26 and/or neighborhood nodes 41 may also contain a processor for tasks associated with monitoring a viewer's interactions with the interactive program guide implemented on set-top boxes 34 and for handling tasks associated with the distribution of program guide data and other information to viewer television equipment 30.

Each set-top box 34 in viewer television equipment 30 may be connected to a videocassette recorder 36 and/or a home storage device 35. Videocassette recorder 36 allows selected television programs to be recorded. Each videocassette recorder 36 may be connected to a television 38. To record a program, set-top box 34 sends control signals to videocassette recorder 36 (e.g., using an infrared transmitter) that directs videocassette recorder 36 to start and stop recording at the appropriate times. Program guide system 20 or 40 may store certain information such as video-on-demand programs and video-on-demand program data in home storage device 35 via set-top box 34.

During use of the interactive television program guide implemented on set-top box 34, video-on-demand program listings and other information may be displayed on television 38. Such program guide displays may be presented so as not to obscure a program to which the viewer has tuned with set-top box 34, or if desired, may be presented as an overlay on top of a portion of a television program. Each set-top box 34, videocassette recorder 36, and television 38 may be controlled by one or more remote controls 50 or any other suitable viewer input interface such as a wireless keyboard, mouse, trackball, dedicated set of buttons, etc.

Figure 5:
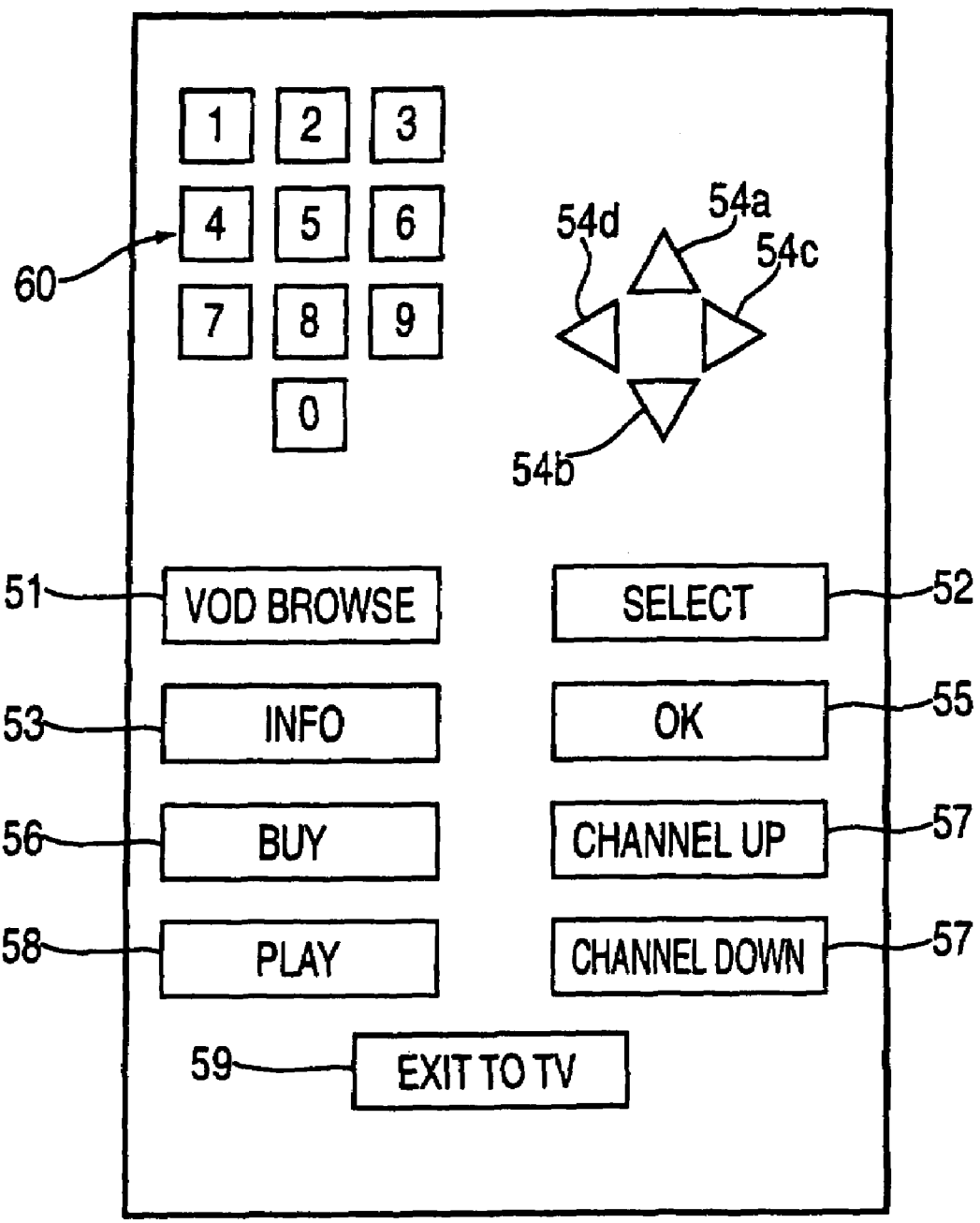
FIG. 5 is a diagram of an illustrative remote control for use with the program guide system of the present invention.

An illustrative remote control 50 is shown in FIG. 5. During normal operation, play key 58 or VOD browse key 51 may be used to toggle the program guide display on and off the main display screen. Channel up and down keys (channel keys) 57 may be used to change the channel to which set-top box 34 is tuned. Up and down cursor keys 54a and 54b may be used to vertically scroll through the available video-on-demand programs on the program guide. Left and right cursor keys 54c and 54d may be used to change the video-on-demand program category. Select key 52 or Buy key 56 may be used to make selections such as when ordering video-on-demand programs by selecting one such program from the available program listings. Numeric keys 60 may be used to directly select a desired program during both normal television viewing or while browsing video-on-demand programs.

While the program guide display is active, info key 53 may be used to invoke a detailed information screen to obtain more information about a particular video-on-demand program. The detailed information screen may contain an on-screen button that may be used to request a particular video-on-demand program. Buy key 56 and/or OK key 55 may be used to activate the on-screen button and thereby order the video-on-demand program displayed on the detailed information screen. Exit to TV key 59 may be used to exit the program guide display and return to normal television viewing mode. Various other keys (not shown) may be used for functions such as controlling power, videocassette recorder (VCR) functions, volume control, etc. The keys for remote control 50 of FIG. 5 represent just one illustrative example of a suitable remote control arrangement. Any other suitable remote control key arrangement may be used if desired.

Set-top box 34 can be directed to present program guide display 70 on main display screen 72. Set-top box 34 may re-proportion (i.e., shrink) the amount of screen area used by current program 77 (channel 5) such that main display screen 72 presents both program guide display 70 and current program 77 unobscured (not shown). However, if desired, program guide display 70 may also be superimposed on top of a portion of current program 77 as shown in FIG. 6. This allows the viewer to simultaneously view video-on-demand program listings while viewing a television program on main display screen 72.

Video-on-demand program guide display 70 may be invoked using any suitable technique such as by using a dedicated key on remote control unit 50 such as play key 58, VOD browse key 51 (FIG. 5), or using an on screen button (not shown). Alternatively, guide 70 may be invoked by first entering a "normal browse mode" (i.e., invoke a program guide display showing regularly broadcast programs) and then select a designated video-on-demand channel using the up and down cursor keys 54a and 54b or numeric keys 60.

Program guide display 70 preferably contains information about a particular video-on-demand program. If desired, such video-on-demand programs may be organized according to certain categories 72 such as "recent releases," "sitcoms," "action/adventure," "drama," etc. In the example of FIG. 6, the viewer is viewing programs in the drama category and information is displayed about a particular drama program that is available on demand. The displayed information may include (but is not limited to) the program title 76 (The Truman Show), the length or "run-time" of that program 74 (110 minutes), a brief text description 73 of that program, an icon 75 indicating that the program is indeed available on demand, an icon 79 indicating that a video clip is available for the listed video-on-demand program, the video-on-demand program number 77 (VOD 1), and the program's rating 78 (TV-Y). More detailed information about a particular video-on-demand program may be available by pressing info key 53 (FIG. 5). Such detailed information may include plot summary, actors and actresses, etc., and may appear on main screen 72 as a separate detailed information screen (not shown).

Although program guide display 70 is shown in FIG. 6 is only a single cell or element in width (i.e., in the vertical dimension), and a single cell or element in length (i.e., in the horizontal dimension), it may also be displayed as multiple cells in either or both dimensions (not shown).

Each cell in program guide display 70 may include a program description box 73 that contains a brief text description of the program title(s) currently shown on guide 70. For example, in the arrangement shown in FIG. 6, the program title "The Truman Show" is shown, so program description box 73 contains a brief text description of The Truman Show program. The viewer may press info key 53 on remote 50 (FIG. 5) to obtain more detailed information about that program and/or to view other available options (not shown). Select key 52 or on screen button may be used to select the other options.

A viewer may navigate through the programs listings in a given video-on-demand category 72 by using any suitable key on remote 50 such as up and down cursor keys 54a and 54b (FIG. 5). This may cause program guide display 70 to display information about the next video-on-demand program in that category. For example, in FIG. 6, program guide display 70 is set to the video-on-demand category "drama" and displays information about the first video-on-demand program (VOD 1) in that category (The Truman Show). If the viewer presses up cursor key 54a once, video-on-demand program number 77 may increment and guide 70 will display information about the next program in that category (i.e., VOD 2). If a viewer presses up cursor key 54a again, video-on-demand program number 77 may increment to the next program in that category (i.e., VOD 3) etc. Down cursor key 54b may operate in a similar fashion to decrement video-on-demand program 77.

Figure 6A:
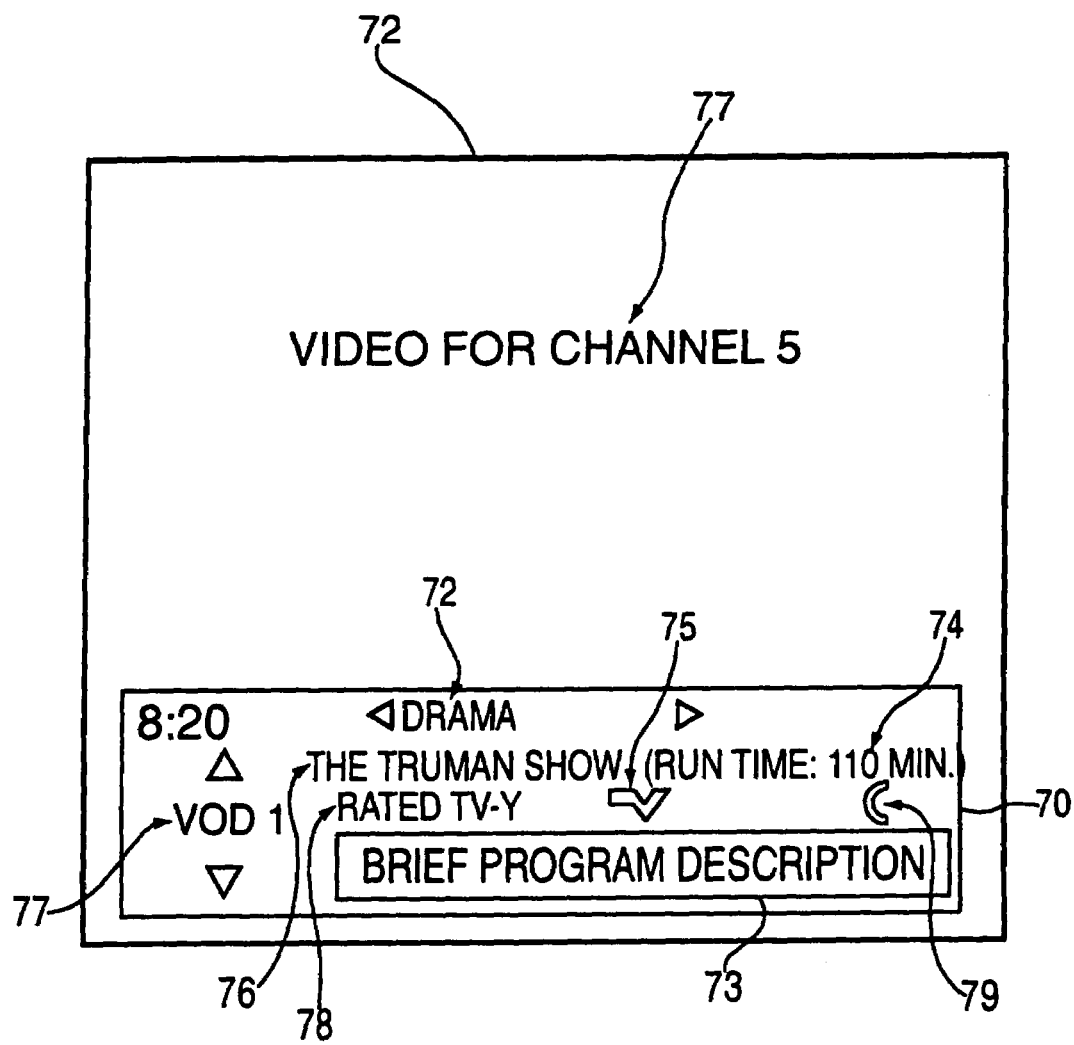
FIG. 6A is an illustrative display screen of a program guide display in accordance with the present invention that a viewer may use to browse video-on-demand programs shown on the program guide display while continuing to view video of a previously selected channel in the background.

Video-on-demand category 72 may be changed by using any suitable key on remote 50 such as right and left cursor keys 54c and 54d (FIG. 5). This may cause program guide display 70 to display the first video-on-demand program in the next video-on-demand category 72. For example, in FIG. 6, video-on-demand category 72 is set to "drama", and the first video-on-demand program (VOD 1) in that category is "The Truman Show." If the viewer presses right cursor key 54c once, video-on demand category 77 may change to another category such as "sitcoms," and information about the first program (VOD 1) in that category is displayed (Seinfeld). This is shown in FIG. 7. If right cursor key 54c is pressed again, category 72 may again increment to the next category (e.g., "recent releases"), etc. Left cursor key 54d may operate in a similar fashion with the provision that it scrolls categories 72 in an order opposite to that of right cursor key 54c. If desired, viewers may also directly tune program guide display 70 to a particular video-on-demand program in a given video-on-demand category 72 using numeric keys 60.

While program guide display 70 is active, the television program to which set-top box 34 is currently tuned continues to be displayed on the main display screen 72. Although a viewer may scroll through several video-on-demand programs on program guide display 70, the video on main display screen 72 remains tuned to the program on channel 5. However, each time a viewer scrolls program guide display 70 to a new video-on-demand program listing, program description box 73 is updated to display information for the currently shown program. As a result, the viewer can watch a selected television program while browsing automatically updated text descriptions of video-on-demand programs. This feature may be particularly useful when, for example, one member of the household desires to browse video-on-demand programs while another household member desires to continue watching a program in progress.

Figure 3:
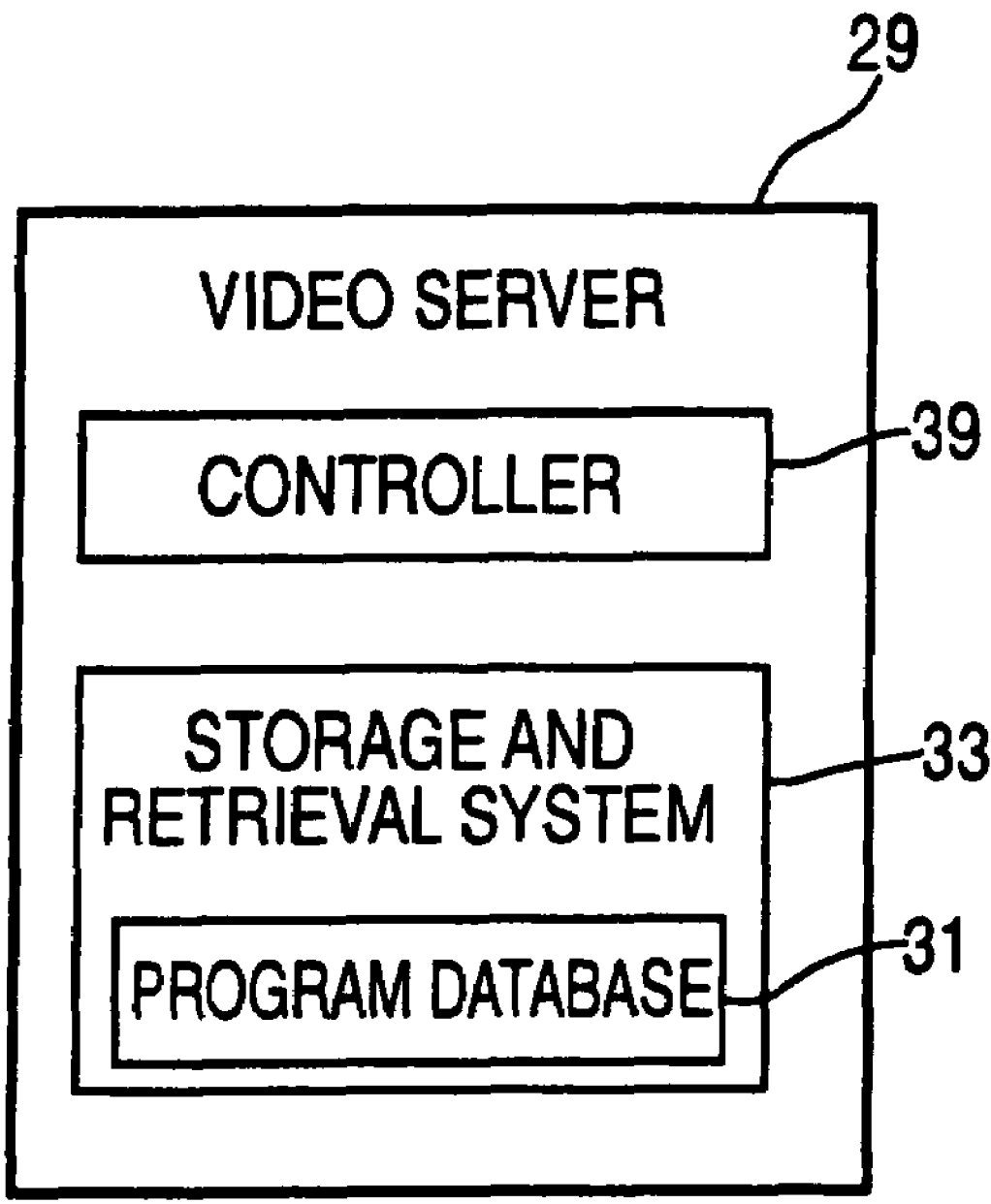
FIG. 3 is a diagram of an illustrative video server for use with the program guide system of the present invention.

Certain video on demand programs may have video clip previews associated with them. As shown in FIG. 6a, program guide display 70 may include a video clip icon 79 to indicate that the listed program has an associated video clip preview. If a viewer who is browsing the program listings on program guide display 70 becomes interested in a particular video-on-demand program, he or she may request a video clip of that program. For example, in FIG. 6, assume the viewer becomes interested in "The Truman Show" program. By pressing any appropriate key on remote 50 such as OK key 55 (FIG. 5), the viewer can direct the program guide to request a video clip of that program from video server 29 (FIG. 3). After the video clip preview has been provided, the viewer may be presented with a display screen inquiring whether the viewer wants to order that program (not shown). The viewer may accept or decline this offer by pressing any appropriate key on remote 50 (FIG. 5) or by using an on screen button (not shown).

Figure 6B:
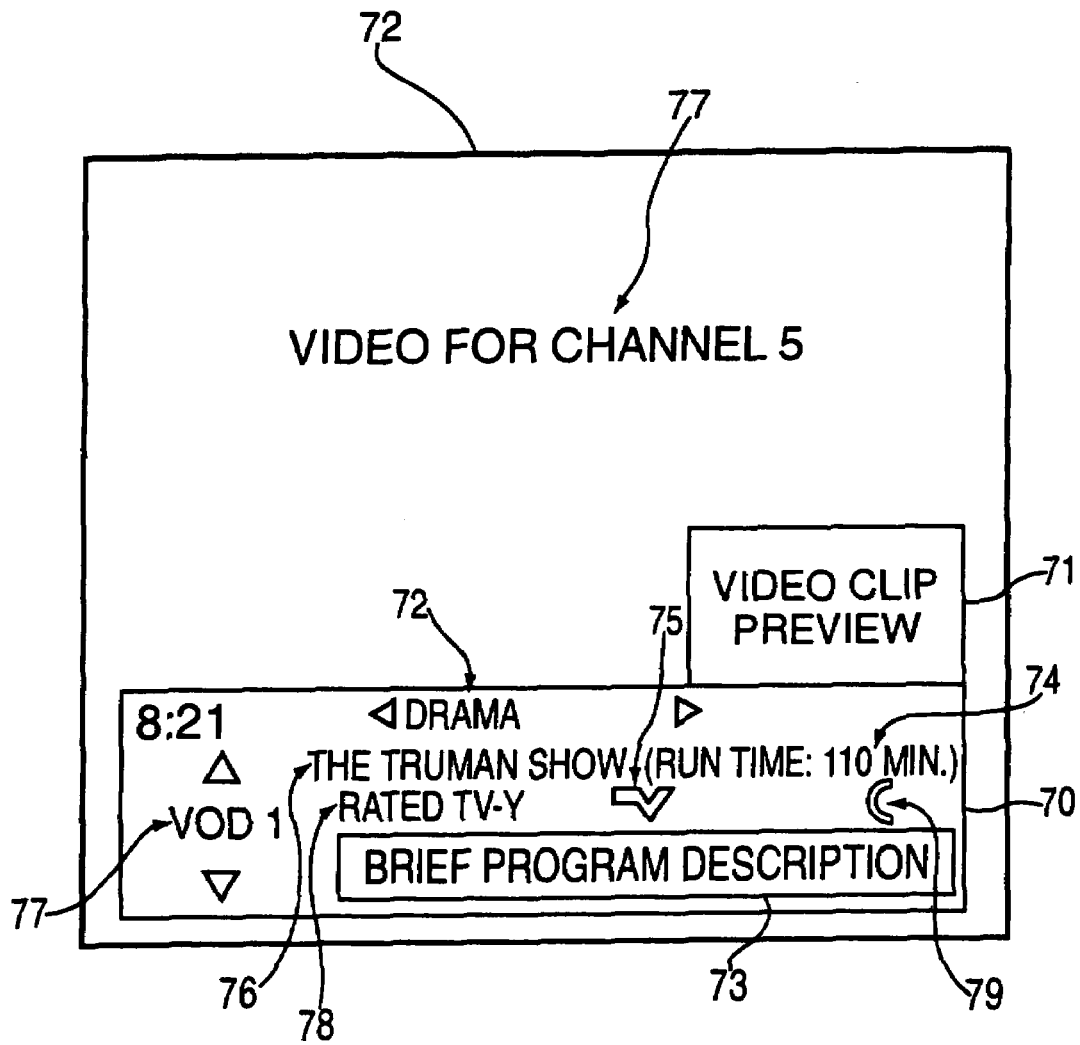
FIG. 6B is an illustrative display screen of a program guide display in accordance with the present invention that a viewer may use to simultaneously: (1) browse video-on-demand programs shown on the program guide display (2) view of video clip of a video on demand program, and (3) view video of a previously selected channel in the background.
Figure 7:
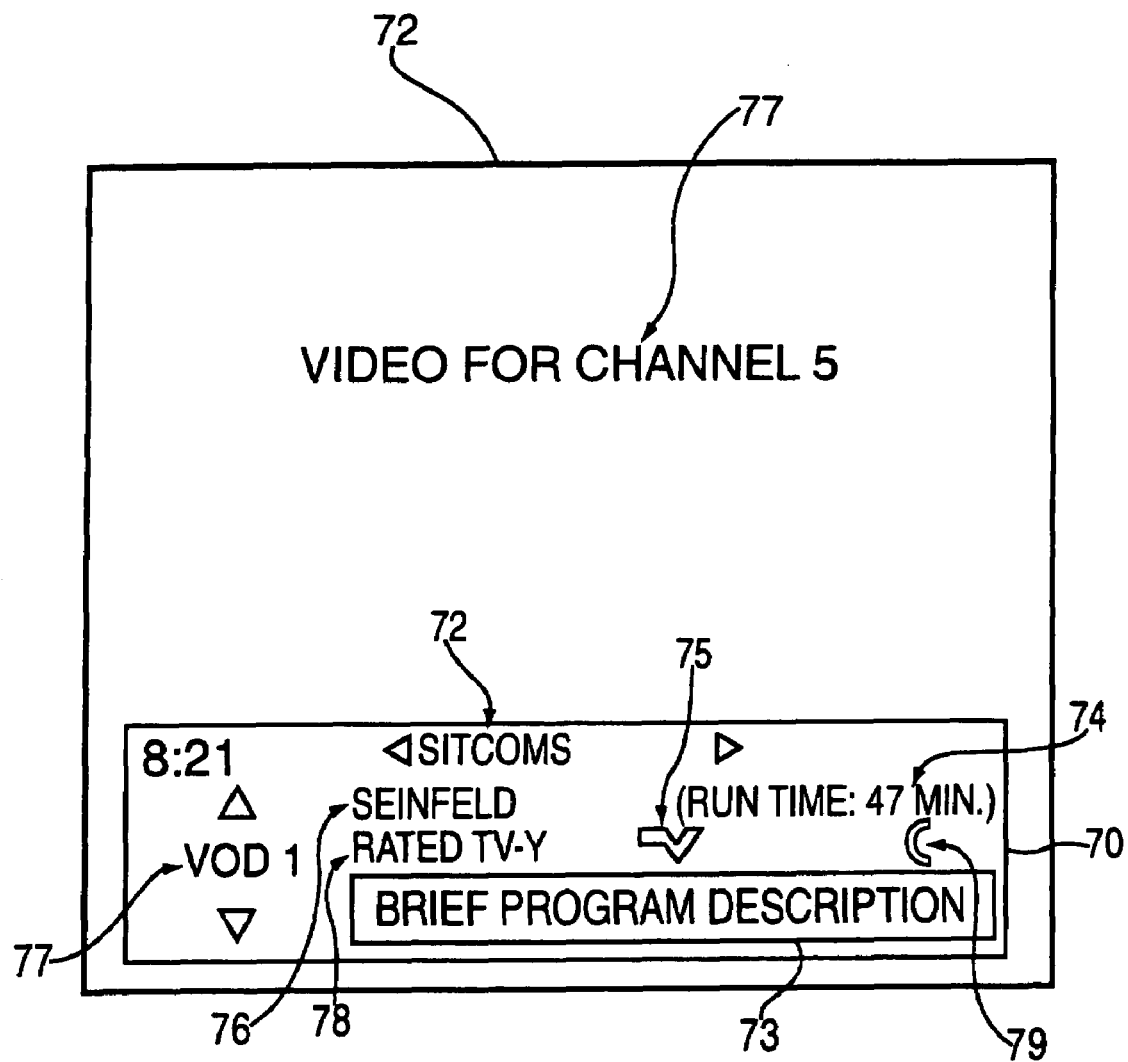
FIG. 7 is an illustrative display screen of a program guide display in accordance with the present invention showing how the program presented in the program guide display may be automatically updated when the viewer changes the program category.

If the viewer requests a video clip preview, the preview may be presented in a video window 71 so that program in progress 77 and program guide display 70, and video window 71 may all be viewed simultaneously (shown in FIG. 6b).

However, in certain embodiments video window 71 may be a full screen display or may be viewer-selectable (i.e., can change from a full screen display to a partial screen display and vice versa). Video window 71 may be implemented using any suitable method such as a partial screen overlay, or a picture-in-picture video window, etc.

If a viewer who is browsing the program listings on program guide display 70 becomes interested in a particular video-on-demand program, he or she may request that program. For example, in FIG. 6, assume the viewer wants to request "The Truman Show" program. By pressing any appropriate key on remote 50 such as select key 52 (FIG. 5), the viewer can direct the program guide to request that program from video server 29 (FIG. 3). If the viewer happens to be browsing more information about a particular program on a detailed information screen (not shown), that screen may contain an on-screen button for ordering that video-on-demand program. By pressing any appropriate key on remote 50 such as buy key 56 (FIG. 5), the viewer may activate the on-screen button and thereby direct the program guide to request that program from video server 29 (FIG. 3).

Figure 8:
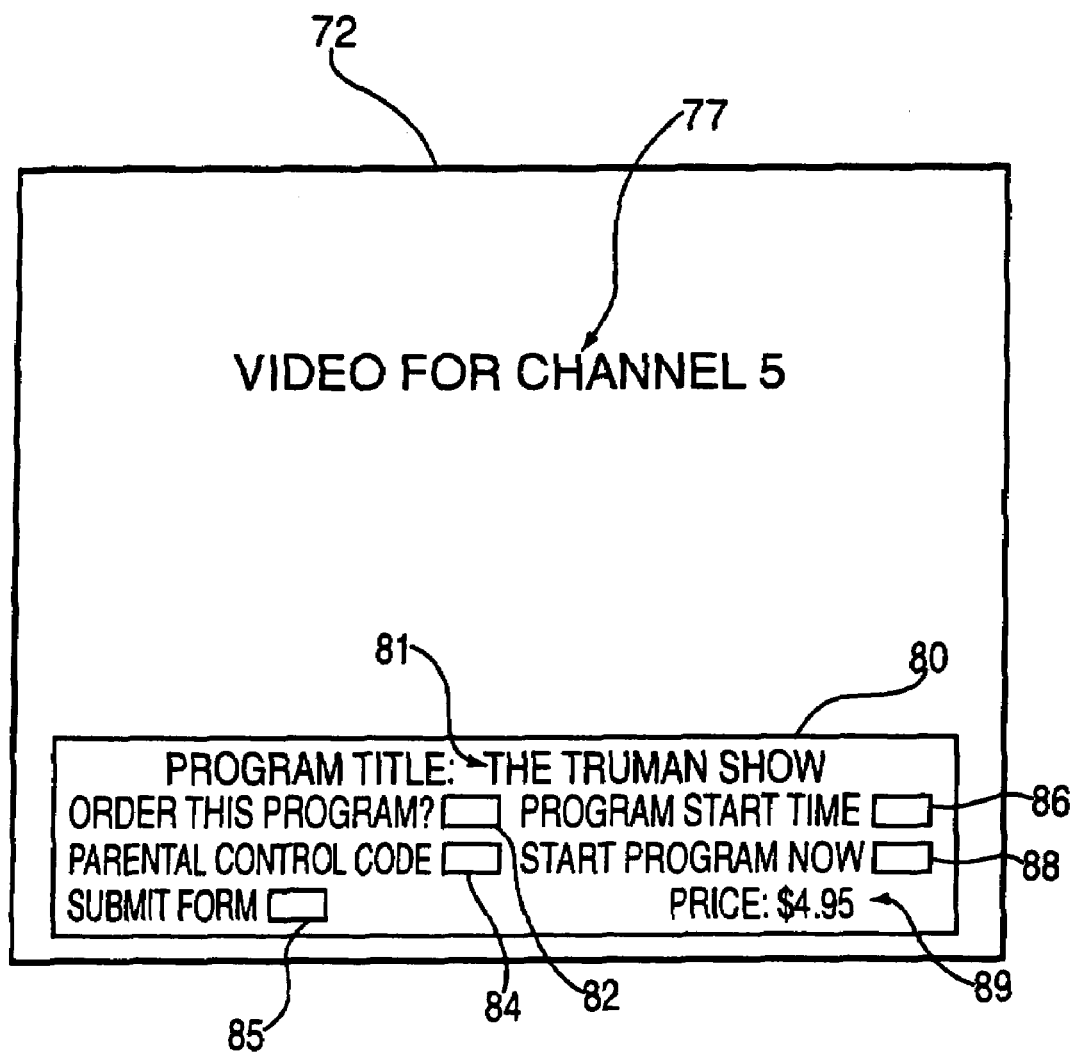
FIG. 8 is an illustrative configuration and control screen for the program guide system of the present invention.

Once the viewer has requested a video-on-demand program, one or more configuration and control screens may appear which require viewer input to complete the order. As shown in FIG. 8, configuration and control screen 80 may contain the title 81 and price 89 of the requested program and a series of data fields for viewer input. Such data fields may include a purchase confirmation field 82, a parental control code field 84, a submit form field 85, a program start-time-field 86 and a start program now field 88. A viewer may navigate through configuration and control screen 80 using cursor keys 54 and may enter the required information into the data fields using appropriate keys on remote 50 (FIG. 5).

Certain data fields on configuration and control screen 80 may require input from numeric keys 60 on remote 50. For example, program start time field 86 may require a numeric input to establish the desired start-time for the requested video-on-demand program. Start-time field 86 may be a pull-down menu that presents a list of start-times (not shown) which may be selected using cursor keys 54 and a binary (yes/no) input key such as OK key 55 on remote 50. Parental control code field 84 may also require a numeric input. Other data fields such as start program now field 88 and purchase confirmation field 82 may also accept input from a binary input key such as OK key 55 on remote 50.

When configuration and control screen 80 has been properly filled out and submitted, the ordering process is complete. The program guide system may provide a reply screen to confirm the viewer's order (not shown).

If a selected video-on-demand program is not to start immediately, it may be fully or partially downloaded into local memory (e.g., in home storage device 35) to lessen the bandwidth required to transmit the program and/or may be transmitted during a non-peak time. A price discount may be offered for such "advance ordering" of a program (not shown).

Figure 9:
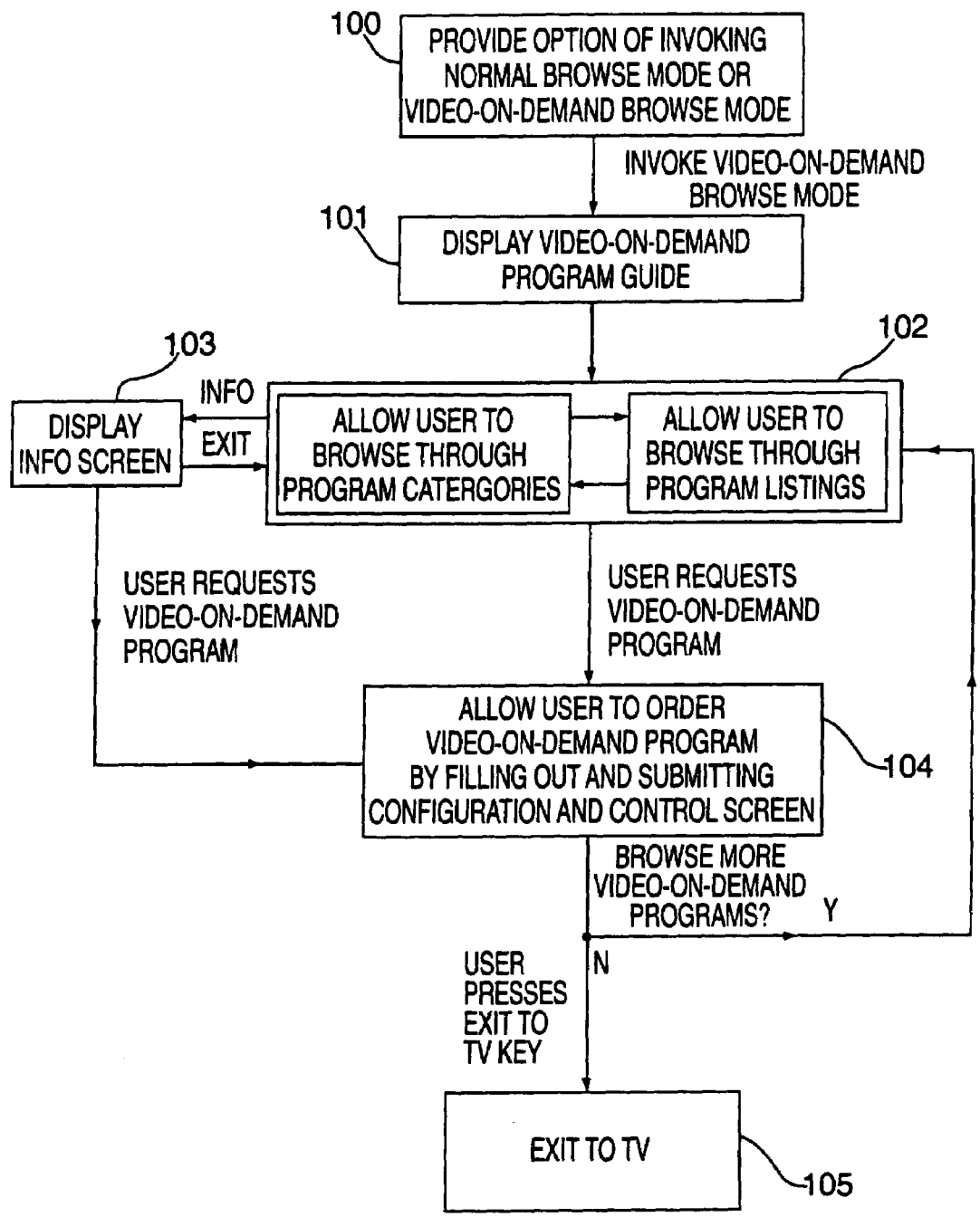
FIG. 9 is a flow chart illustrating some of steps involved in providing browsing display screens in accordance with the present invention.

Some of the steps involved in providing the browsing display features described herein are illustrated in the flow chart of FIG. 9. At step 100, the program guide provides the viewer with an option for invoking either the video-on-demand browsing mode or the normal browsing mode. If the viewer chooses to invoke the video-on-demand browsing mode, program guide display 70 is displayed on viewer television equipment 30 at step 101. If the viewer chooses to invoke the normal browsing mode, the program guide displays a program guide display (not shown) on viewer television equipment 30, possibly displaying a program listing reflecting the current channel.

Assuming video-on-demand browsing mode is chosen at step 100, program guide display 70 is displayed on viewer television equipment 30 at step 101. When program guide display 70 is initially displayed, it may be set to a "default" category and program listing, or it may return to previously selected category and/or program. At step 102, the viewer may browse through the available program categories using left and right cursor keys 54d and 54c and/or browse the available programs in that category using up and down cursor keys 54a and 54b. If a program of interest is not found in that category, a new category may be selected and the viewer may browse programs in that category. The viewer may continue to browse through the available categories and programs until a program of interest is found or may exit program guide display 70 by pressing the exit to TV key 59 on remote 50 (FIG. 5).

If a video-on-demand program of interest is found, the viewer has several options. For example, the viewer may: 1) request a video clip of the program, if available (e.g., using an on-screen button or remote control key), 2) request the program (e.g., using an on-screen button or remote control key) or 3) request more information about that program by pressing info key 53 (step 103). If a video clip is requested, the video clip is presented on the viewer's display screen (step 102). If a video-on-demand program is requested, a configuration and control screen may appear which requires viewer input (step 104). The viewer may fill-out and submit this form to order the requested program.

At this point, the viewer may be returned to program guide display 70 to browse more video-on-demand programs or, if desired, the viewer may press the exit to TV key to exit the program guide (step 105).

If the selected program has been set to start immediately, the program guide will provide the program immediately. However, if the selected program is ordered for a later time, the program guide may automatically start the program at that later time. Furthermore, the program guide may be configured to present a reminder screen (not shown) sometime before the selected program is to be shown so that the viewer is reminded of the scheduled start-time. When this reminder is received, the viewer may be given the option to: 1) watch the program at the scheduled time, 2) watch the program immediately, 3) reschedule the program to another time (e.g., by entering a new start-time or selecting a start-time from a list provided by the program guide), or 4) cancel the selected program.

Although not specifically shown in the flow chart of FIG. 9, the viewer may at any time exit back to the normal television viewing by pressing the exit to TV key 59 on remote 50.

The foregoing is merely illustrative of the principles of this invention and various modifications can be made by those skilled in the art without departing from the scope and spirit of the invention.

What is claimed is:

1. A method for using an interactive television program guide system implemented on viewer television equipment having a main display screen, the method comprising:
    displaying a program on the main display screen;
    allowing a viewer to invoke a partial screen program guide display including a first program listing, wherein the first listing is related to a regularly broadcast program;
    allowing the viewer to invoke display of a second program listing within the partial screen program guide, wherein the second listing is related to a video-on-demand program;
    indicating that a program related to at least one program listing displayed in the partial screen program guide is available on-demand;
    allowing the viewer to select the program indicated to be available on-demand; and
    allowing the viewer to place an order for the selected program indicated to be available on-demand.

2. The method of claim 1, wherein invoking the display of the second program listing replaces the first program listing with the second program listing within the partial screen program guide.

3. The method of claim 1, wherein the first program listing and the second program listing are displayed simultaneously within the partial screen program guide.

4. The method of claim 1, wherein the indication is provided with the first program listing.

5. The method of claim 1, wherein the indication is provided with the second program listing.

6. The method of claim 1, wherein the at least one program listing displayed in the partial screen program guide is organized by available categories.

7. The method of claim 6, further comprising allowing the viewer to browse through the available categories in the partial screen program guide display.

8. The method of claim 7, further comprising displaying at least one video-on-demand program listing in the partial screen program guide related to the browsed available categories.

9. The method of claim 1, further comprising providing the viewer with more detailed information about the program indicated to be available on-demand when the viewer presses a control key.

10. The method of claim 1, further comprising providing a video clip preview of the program indicated to be available on-demand.

11. The method of claim 10, wherein the order is placed for the selected program indicated to be available on-demand while the video clip preview is simultaneously provided.

12. The method of claim 10, wherein the video clip preview is provided in a partial screen video window while the partial screen program guide is displayed.

13. The method of claim 12, wherein the video clip preview is provided in a partial screen video window while the program is displayed.

14. The method of claim 1, further comprising requiring the viewer to enter a parental control code when the order is placed for the selected program indicated to be available on-demand.

15. The method of claim 1, further comprising displaying an order confirmation display screen in response to the order being placed.

16. An interactive television program guide system implemented on viewer television equipment, the system comprising:
    a display configured to display a program on a main display screen;
    the viewer television equipment configured to:
        allow a viewer to invoke a partial screen program guide to display on the display, wherein the partial screen program guide includes a first program listing, wherein the first listing is related to a regularly broadcast program;

allow the viewer to invoke display of a second program listing within the partial screen program guide, wherein the second listing is related to a video-on-demand program;

indicate that a program related to at least one program listing displayed in the partial screen program guide is available on-demand;

allow the viewer to select the program indicated to be available on-demand; and allow the viewer to place an order for the selected program indicated to be available on-demand.

17. The system of claim 16, wherein invoking the display of the second program listing replaces the first program listing with the second program listing within the partial screen program guide.

18. The system of claim 16, wherein the first program listing and the second program listing are displayed simultaneously within the partial screen program guide.

19. The system of claim 16, wherein the indication is provided with the first program listing.

20. The system of claim 16, wherein the indication is provided with the second program listing.

21. The system of claim 16, wherein the at least one program listing displayed in the partial screen program guide is organized by available categories.

22. The system of claim 21, wherein the viewer television equipment is further configured to allow the viewer to browse through the available categories in the partial screen program guide display.

23. The system of claim 22, wherein the viewer television equipment is further configured to display at least one video-on-demand program listing in the partial screen program guide related to the browsed available categories.

24. The system of claim 16, wherein the viewer television equipment is further configured to provide the viewer with more detailed information about the program indicated to be available on-demand when the viewer presses a control key.

25. The system of claim 16, wherein the viewer television equipment is further configured to provide a video clip preview of the program indicated to be available on-demand.

26. The system of claim 25, wherein the order is placed for the selected program indicated to be available on-demand while the video clip preview is simultaneously provided.

27. The system of claim 25, wherein the video clip preview is provided in a partial screen video window while the partial screen program guide is displayed.

28. The system of claim 27, wherein the video clip preview is provided in a partial screen video window while the program is displayed.

29. The system of claim 16, wherein the viewer television equipment is further configured to require the viewer to enter a parental control code when the order is placed for the selected program indicated to be available on-demand.

30. The system of claim 16, wherein the viewer television equipment is further configured to display an order confirmation display screen in response to the order being placed.

* * * * *